(12) United States Patent
Sawauchi et al.

(10) Patent No.: US 8,299,155 B2
(45) Date of Patent: Oct. 30, 2012

(54) AQUEOUS FLUOROPOLYMER DISPERSION

(75) Inventors: Chie Sawauchi, Osaka (JP); Nobuhiko Tsuda, Osaka (JP); Wade Martin Simpson, Decatur, AL (US)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/034,018

(22) Filed: Feb. 24, 2011

(65) Prior Publication Data

US 2011/0144255 A1     Jun. 16, 2011

Related U.S. Application Data

(63) Continuation of application No. 12/040,335, filed on Feb. 29, 2008, now abandoned, which is a continuation-in-part of application No. PCT/JP2006/317222, filed on Aug. 31, 2006.

(30) Foreign Application Priority Data

Sep. 1, 2005  (JP) .................. 2005-254155
Jun. 29, 2006 (JP) .................. 2006-180244

(51) Int. Cl.
C04B 24/22    (2006.01)
C08K 5/095    (2006.01)

(52) U.S. Cl. ........................ 524/247; 524/319

(58) Field of Classification Search .............. 524/186, 524/378, 463, 247, 319
See application file for complete search history.

(56) References Cited

U.S. PATENT DOCUMENTS

| | | |
|---|---|---|
| 6,040,370 A | 3/2000 | Wozny et al. |
| 6,103,843 A | 8/2000 | Abusleme et al. |
| 6,429,258 B1 | 8/2002 | Morgan et al. |
| 2004/0171736 A1 | 9/2004 | Dadalas et al. |
| 2004/0186219 A1 | 9/2004 | Dadalas et al. |
| 2005/0154104 A1 | 7/2005 | Malvasi et al. |

FOREIGN PATENT DOCUMENTS

| | | | |
|---|---|---|---|
| JP | 7-150099 A | 6/1995 | |
| JP | 2000-198899 A | 7/2000 | |
| JP | 2004-359870 A | 12/2004 | |
| JP | 2005-501956 A | 1/2005 | |
| JP | 2005-171250 A | 6/2005 | |
| WO | 03020836 A1 | 3/2003 | |

OTHER PUBLICATIONS

Triton X-100 Data Sheet. Sep. 2005.
Machine Translation of JP 2004-359870.
State of Understanding of Nafion Chem. Rev. 2004, 104, 4535-4585.

*Primary Examiner* — Ling Choi
*Assistant Examiner* — John Uselding
(74) *Attorney, Agent, or Firm* — Sughrue Mion, PLLC

(57) ABSTRACT

An object of the present invention is to provide an aqueous fluoropolymer dispersion inhibited from viscosity rising and excellent in mechanical stability in spite of a low fluorinated surfactant concentration. The invention provides an aqueous fluoropolymer dispersion comprising particles of a fluoropolymer as dispersed in an aqueous medium wherein a fluorinated surfactant (A) having a molecular weight lower than 1000 amounts to not higher than 100 ppm of the mass of the fluoropolymer, the aqueous fluoropolymer dispersion containing an anionic surfactant (B) other than the fluorinated surfactant (A) as well as a water-soluble polymer (C).

15 Claims, No Drawings

AQUEOUS FLUOROPOLYMER DISPERSION

CROSS REFERENCE TO RELATED APPLICATIONS

This is a continuation of U.S. application Ser. No. 12/040,335 filed Feb. 29, 2008 which is a continuation-in-part of PCT/JP2006/317222 filed Aug. 31, 2006 and which claims priority from Japanese Patent Application Nos. 2005-254155 filed Sep. 1, 2005 and 2006-180244 filed Jun. 29, 2006, the above-noted applications incorporated herein by reference in their entirety.

TECHNICAL FIELD

The present invention relates to an aqueous fluoropolymer dispersion.

BACKGROUND ART

Aqueous fluoropolymer dispersions have so far been used in manufacturing impregnated materials, such as roofing materials for membrane structures, by impregnating glass fibers, carbon fibers, Kevlar fibers and the like therewith and, further, in forming films by applying the same onto articles to be coated, followed by baking, in such fields of application as high-frequency printed circuit boards, transfer belts and packing materials.

Those aqueous fluoropolymer dispersions which are known in the art have the following problems caused, among others, by (1) the fact that increases in fluoropolymer concentration result in increases in viscosity, making the handling difficult and (2) the fact that when they undergo mechanical stresses on the occasion of transfer, film formation or like processing, fluoropolymer particles tend to form aggregates, resulting in deteriorations in quality of the aqueous dispersions and of films, impregnated articles and the like obtained by using the same (the so-called mechanical stability problem). These problems are significant particularly at low fluorinated surfactant content levels.

As high-concentration aqueous fluoropolymer dispersions low in viscosity, there have been proposed fluoropolymer dispersions containing a fluorinated surfactant having a molecular weight of lower than 1000 at a solid concentration level lower than 0.025% by weight and containing a nonfluorinated nonionic surfactant and a surfactant selected from the group consisting of fluorinated anionic surfactants having a molecular weight of not lower than 1000, nonfluorinated anionic surfactants, and mixtures thereof (cf. e.g. Patent Document 1) and fluoropolymer dispersions which contain a nonfluorinated nonionic surfactant or a mixture of a nonfluorinated nonionic surfactant and a nonfluorinated anionic surfactant as so selected as to provide a specific viscosity characteristic (VTT) and which contain a fluorinated surfactant having a molecular weight of lower than 1000 at a solid concentration level not higher than 0.05% by weight (cf. e.g. Patent Document 2).

However, any composition to be added to such fluoropolymer dispersions for maintaining their mechanical stability is not disclosed in those documents.

For the purpose of achieving improvements in mechanical stability, a composition resulting from incorporation, in an aqueous PTFE dispersion obtained by emulsion polymerization, of a specific nonionic surfactant and polyethylene oxide having a specific average molecular weight or a water-soluble polyurethane-based associative thickener, each in an specific amount has been proposed (cf. e.g. Patent Document 3).

However, this technology is not intended for reducing the content of the fluorinated surfactant used in emulsion polymerization.

Patent Document 1: United States Patent Application Publication 2004/186219
Patent Document 2: United States Patent Application Publication 2004/171736 ([0016])
Patent Document 3: Japanese Kokai Publication 2000-198899 (claim 1, [0019])

DISCLOSURE OF INVENTION

Problems which the Invention is to Solve

In view of the above-discussed state of the art, it is an object of the present invention to provide an aqueous fluoropolymer dispersion inhibited from viscosity rising and excellent in mechanical stability in spite of a low fluorinated surfactant concentration.

Means for Solving the Problems

The present invention is related to an aqueous fluoropolymer dispersion comprising a particle of fluoropolymer as dispersed in an aqueous medium wherein a fluorinated surfactant (A) having a molecular weight lower than 1000 amounts to not higher than 100 ppm of the mass of the fluoropolymer, the aqueous fluoropolymer dispersion containing an anionic surfactant (B) other than the fluorinated surfactant (A) as well as a water-soluble polymer (C). Hereinafter, the present invention is described in detail.

The aqueous fluoropolymer dispersion of the present invention comprises a particle of fluoropolymer as dispersed in an aqueous medium.

In the practice of the present invention, the fluoropolymer is a polymer having fluorine atoms respectively bound to carbon atoms.

The fluoropolymer is not particularly restricted but includes polytetrafluoroethylene [PTFE], modified PTFE, tetrafluoroethylene [TFE]/hexafluoropropylene [HFP] copolymers [FEPs], TFE/perfluoro(alkyl vinyl ether) [PAVE] copolymers [PFAs], ethylene/TFE copolymers [ETFEs], poly(vinylidene fluoride) [PVDF] and polychlorotrifluoroethylene [PCTFE], among others.

The term "modified PTFE" as used herein means a non-melt-processable fluoropolymer obtained by polymerizing TFE and a very small proportion monomer. As the very small proportion monomer, there may be mentioned, for example, fluoroolefins such as HFP and chlorotrifluoroethylene [CTFE], fluoro(alkyl vinyl ether) species whose alkyl moiety has 1 to 5 carbon atoms, in particular 1 to 3 carbon atoms; fluorodioxoles; perfluoroalkylethylenes; and ω-hydroperfluoroolefins.

Perfluoropolymers are preferred as the above fluoropolymer, and PTFE and modified PTFE are preferred among others.

The particles of fluoropolymer generally have an average primary particle diameter of 50 to 500 nm, preferably 100 to 350 nm.

The average primary particle diameter mentioned above is determined in the following manner. A working curve is constructed which shows the relation between the transmittance of incident light rays having a wavelength of 550 nm per unit length of an aqueous dispersion adjusted to a fluoropolymer concentration of 0.22% by mass and the average primary particle diameter determined by particle diameter measurements in a certain specific direction on a transmission electron photomicrograph, and the average primary particle diameter of a sample is determined, using the working curve, from the transmittance as measured in the above manner.

The particles of fluoropolymer preferably amounts to 30 to 70% by mass of the aqueous fluoropolymer dispersion. The particles of fluoropolymer amounts to more preferably 35% by mass or more, and a more preferred is 65% by mass or less. The content of particles of the fluoropolymer, so referred to herein, is determined by weighing about 1 g (X g) of the sample in an aluminum cup with a diameter of 5 cm, drying the sample at 100° C. for 1 hour and then further drying at 300° C. for 1 hour to give a heating residue (Z) and making a calculation as follows: P=Z/X×100(%).

The above-mentioned fluoropolymer can be prepared, for example, by polymerization in an aqueous medium in the presence of a fluorinated surfactant (A), which is to be described later herein.

The aqueous fluoropolymer dispersion of the present invention maintains an adequate level of viscosity and is excellent in mechanical strength even when the content of the fluorinated surfactant (A) in the polymerization mentioned above is low. The fluorinated monomer to be subjected to the above polymerization is not particularly restricted but includes, among others, TFE, HFP, PAVEs and vinylidene fluoride [VDF]. In the above polymerization, only one or two or more fluorinated monomers may be used. In the above polymerization, a nonfluorinated monomer such as ethylene may also be used according to need.

Such polymerization conditions as temperature and pressure can be properly selected according to the fluorinated monomer and surfactant species employed and the amounts thereof, the desired fluoropolymer species and other factors.

The fluoropolymer mentioned above may be one obtained by after-treatment following the above polymerization.

The after-treatment is not particularly restricted but includes such conventional procedures as concentration and purification; treatment for eliminating the fluorinated surfactant (A) is preferred, however. The after-treatment may comprise one run of only a conventional procedure, or two or more repetitions of that or of two or more conventional procedures in combination.

As the method of concentration to be carried out as the above after-treatment, there may be mentioned, for example, the cloud point concentration method described in International Publication WO 2004/050719, the anion exchange resin treatment method described in Japanese Kohyo Publication 2002-532583 and the ultrafiltration method described in Japanese Kokai Publication Sho-55-120630.

The aqueous medium in the aqueous fluoropolymer dispersion of the present invention is not particularly restricted but may be any water-containing liquid. Thus, it may contain, in addition to water, a non-fluorinated organic solvent and/or a fluorinated organic solvent such as an alcohol, ether, ketone or paraffin wax.

In the aqueous fluoropolymer dispersion of the present invention, the fluorinated surfactant (A) having a molecular weight lower than 1000 amounts to not higher than 100 ppm of the mass of the above-mentioned fluoropolymer.

The fluorinated surfactant (A) amounts to preferably not higher than 50 ppm of the mass of the fluoropolymer. The surfactant (A) amounts to more preferably not higher than 30 ppm, still more preferably not higher than 10 ppm.

In the practice of the present invention, the fluorinated surfactant (A) is not particularly restricted but may be any one with at least one fluorine atom, having a molecular weight lower than 1000. Preferably, it is one of 7 to 10 carbon atoms. More preferably, it is a fluorinated anionic surfactant (A1) of 7 to 10 carbon atoms.

As the fluorinated anionic surfactant, there may be mentioned, for example, perfluorooctanoic acid [PFOA], perfluorooctylsulfonic acid [PFOS] and like fluorinated organic acids, or salts thereof.

When the fluorinated surfactant (A) is in the form of a salt, the salt-forming counter ion is, for example, an alkali metal ion or $NH_4^+$; the alkali metal ion is, for example, $Na^+$ or $K^+$. $NH_4^+$ is preferred as the counter ion, among others.

The fluorinated surfactant concentration, so referred to herein, is determined by adding an equal volume of methanol to the aqueous dispersion to be assayed, subjecting the mixture to Soxhlet extraction and subjecting the extract to high-performance liquid chromatography [HPLC], which is described later herein.

The aqueous fluoropolymer dispersion of the present invention further contains an anionic surfactant (B) other than the fluorinated surfactant (A) and a water-soluble polymer (C).

The anionic surfactant (B) is selected from the group consisting of (1) sulfosuccinic acid alkyl esters or salts thereof, and/or sulfosuccinic acid fluoroalkyl esters or salts thereof, (2) fluorinated surfactants (a) other than the fluorinated surfactant (A), which have a molecular weight lower than 1000, and (3) nonfluorinated anionic surfactants having an acid group and showing a pKa value lower than 4.

When the anionic surfactant (B) occurs as a salt, it may include partly or wholly dissociated forms thereof.

The anionic surfactant (B) in the aqueous fluoropolymer dispersion of the present invention may comprise only one of the compounds (1) to (3) mentioned above or two or more of the compounds (1) to (3). Each of the compounds (1) to (3) may comprise one single species or two or more species.

The above-mentioned sulfosuccinic acid alkyl esters or salts thereof and/or sulfosuccinic acid fluoroalkyl esters or salts thereof (1) are preferably diesters although those may also be monoesters.

As the compound (1), there may be mentioned, for example, sulfosuccinic acid alkyl esters or salts thereof represented by the following general formula (I):

$$R^1—OCOCH(SO_3A)CH_2COO—R^2 \quad (I)$$

(wherein $R^1$ and $R^2$ are the same or different and each represents an alkyl group of 4 to 12 carbon atoms and A represents an alkali metal, an alkaline earth metal or $NH_4$), or sulfosuccinic acid fluoroalkyl esters or salts thereof represented by the following general formula (II):

$$Rf^1—R^3—OCOCH(SO_3A)CH_2COO—R^4—Rf^2 \quad (II)$$

(wherein $Rf^1$ and $Rf^2$ are the same or different and each represents a perfluoroalkyl group of 1 to 6 carbon atoms, which optionally has a terminal hydrogen atom, $R^3$ and $R^4$ are the same or different and each represents an alkylene group of 1 to 5 carbon atoms and A represents an alkali metal, an alkaline earth metal or $NH_4^+$).

As $R^1$ and $R^2$ in the above general formula (I), there may be mentioned, for example, such straight or branched alkyl groups as n-butyl, isobutyl, sec-butyl, n-pentyl, isopentyl, neopentyl, tert-pentyl, n-hexyl, isohexyl, tert-hexyl, n-heptyl, isoheptyl, tert-heptyl, n-octyl, isooctyl, tert-octyl, n-nonyl, isononyl, tert-nonyl, n-decyl and 2-ethylhexyl. $R^1$ and $R^2$ each is preferably an alkyl group of 8 to 12 carbon atoms.

In the above general formula (II), $Rf^1$ and $Rf^2$ each is preferably an alkyl group of 3 to 5 carbon atoms, and $R^3$ and $R^4$ each is preferably an alkyl group of 1 or 2 carbon atoms.

Preferred as A in the above general formulas (I) and (II) are, for example, Na and $NH_4$.

The anionic surfactant (B) in the aqueous fluoropolymer dispersion of the present invention is preferably a sulfosuccinic acid alkyl ester represented by the general formula (I) or a salt thereof and, more preferably, is one represented by the above general formula (I) in which $R^1$ and $R^2$ are the same or different and each is an alkyl group having 8 to 12 carbon atoms.

As the sulfosuccinic acid alkyl ester, there may be mentioned, for example, di-n-octyl sulfosuccinate and di-2-ethylhexyl sulfosuccinate.

In the practice of the present invention, the fluorinated surfactant (a) mentioned above under (2) is not particularly restricted but may be any fluorinated surfactant other than the fluorinated surfactant (A), which has a molecular weight lower than 1000. Preferably, it has 4 to 7 carbon atoms, more preferably 5 to 7 carbon atoms.

Further, the fluorinated surfactant (a) mentioned above under (2) is preferably a fluorinated anionic surfactant and, more preferably, it is a fluorinated anionic surfactant (a1) of 4 to 7 carbon atoms.

Preferred, among others, as the fluorinated anionic surfactant are fluoroalkylcarboxylic acids or salts thereof and fluoroalkylsulfonic acids or salts thereof. More preferred are perfluorocarboxylic acids or salts thereof and perfluoroalkylsulfonic acids or salts thereof.

When the fluorinated anionic surfactant (a1) is in the form of a salt, the salt-forming counter ion is, for example, an alkali metal ion or $NH_4^+$; as the alkali metal ion, there may be mentioned $Na^+$ and $Ka^+$, among others. Among them, $NH_4^+$ is preferred as the counter ion.

The nonfluorinated anionic surfactant (3) having an acid group and showing a pKa value lower than 4 is generally a nonfluorinated compound having an acid group and showing a pKa within the range mentioned above.

The acid group is preferably selected from the group consisting of carboxyl, sulfonyl and phosphoric acid groups and salts thereof. Among others, it is preferably selected from the group consisting of carboxyl and sulfonyl groups and salts thereof. In the practice of the present invention, the nonfluorinated anionic surfactant mentioned above under (3) may further have, in addition to the above acid group, a polyoxyalkylene group in which each oxyalkylene group has 2 to 4 carbon atoms, an amino group or a like other group. In that surfactant, the above-mentioned amino group is not protonated.

The nonfluorinated anionic surfactant (3) preferably has a pKa value not higher than 3. When the nonfluorinated anionic surfactant is capable of stepwise dissociation, it is only required that the lowest of the pKa values be within the range specified above.

Preferred as the surfactant (3) are anionic hydrocarbon-based surfactants having a hydrocarbon as the main chain. The hydrocarbon moiety of the nonfluorinated anionic surfactant (3) does not have the acid group mentioned above. As the hydrocarbon, there may be mentioned, for example, ones containing a saturated or unsaturated aliphatic chain having 6 to 40 carbon atoms, preferably 8 to 20 carbon atoms, more preferably 9 to 13 carbon atoms. The saturated or unsaturated aliphatic chain may be either straight or branched and may be one having a cyclic structure. The above-mentioned hydrocarbon may also be one of aromatic nature or an aromatic group having one. The hydrocarbon may further be one having at least one such hetero atom as an oxygen, nitrogen or sulfur atom.

As the surfactant (3), there may be mentioned alkylsulfonates, alkyl sulfates and alkylaryl sulfates and salts thereof; aliphatic (carboxylic) acids and salts thereof; phosphoric acid alkyl esters and phosphoric acid alkylaryl esters or salts thereof. Among them, ones selected from the group consisting of sulfonic acids and carboxylic acids, inclusive of salts thereof, are preferred, and aliphatic carboxylic acids or salts thereof are preferred.

Preferred as the aliphatic carboxylic acids or salts thereof, are, for example, saturated or unsaturated aliphatic carboxylic acids of 9 to 13 carbon atoms in which a —OH group is optionally substituted for a terminal H, or salts thereof. Preferred as such aliphatic carboxylic acids are monocarboxylic acids, and decanoic acid, undecanoic acid, undecenoic acid, lauric acid and hydroxydodecanoic acid are preferred as the monocarboxylic acids.

The aqueous fluoropolymer dispersion of the present invention preferably contains, as the anionic surfactant (B), (1) sulfosuccinic acid alkyl esters or salts thereof or sulfosuccinic acid fluoroalkyl esters or salts thereof and/or (3) nonfluorinated anionic surfactants having an acid group and showing a pKa lower than 4 and, more preferably, it contains (1) sulfosuccinic acid alkyl esters or salts thereof and/or a sulfosuccinic acid fluoroalkyl esters or salts thereof.

In the aqueous fluoropolymer dispersion of the present invention, the anionic surfactant (3) mentioned above generally amounts to 5 to 5000 ppm, preferably 5 to 2500 ppm, still more preferably 5 to 1000 ppm, still further preferably 10 to 700 ppm, of the mass of the fluoropolymer. From the addition level reduction viewpoint, the surfactant (B) amounts to generally 5 to 500 ppm, preferably 5 to 400 ppm, still more preferably 200 ppm or a smaller amount, still further preferably 180 ppm or smaller amount, particularly preferably 150 pm or smaller amount, of the mass of the fluoropolymer. Further, provided that it is within the above range, from the mechanical strength improvement viewpoint, among others, the surfactant (B) amounts to preferably 10 ppm or a larger amount, more 20 ppm or a larger amount, still more preferably 30 ppm or a larger amount, of the mass of the fluoropolymer.

When the aqueous fluoropolymer dispersion contains a surfactant (1) added as the anionic surfactant (B), the surfactant (1) amounts to generally 5 to 5000 ppm, preferably 5 to 2500 ppm, still more preferably 5 to 1000 ppm, of the mass of the fluoropolymer. From the addition level reduction viewpoint, the surfactant (1) amounts to preferably 5 to 500 ppm, more preferably 300 ppm or a smaller amount, particularly preferably 200 ppm or a smaller amount, of the mass of the fluoropolymer. Further, provided that it is within the above range, from the mechanical strength improvement viewpoint, among others, the surfactant (1) amounts to preferably 10 ppm or a larger amount of the mass of the fluoropolymer.

On the other hand, when a surfactant (3) is added as the nonionic surfactant (B), the surfactant (3) amounts to generally 5 to 5000 ppm, preferably 5 to 2500 ppm, more preferably 5 to 1000 ppm, of the mass of the fluoropolymer. From the addition level reduction viewpoint, the surfactant (3) may amount to generally 500 ppm or a smaller amount, preferably 350 ppm or a smaller amount, more preferably 300 ppm or a smaller amount, still more preferably 200 ppm or a smaller amount, of the mass of the fluoropolymer. Further, provided that it is within the above range, from the mechanical strength improvement viewpoint, among others, the surfactant (3) may amount to 10 ppm or a larger amount of the mass of the fluoropolymer.

In the present specification, the content of the anionic surfactant (B) can be determined by the method for fluorinated surfactant concentration determination which is described later herein or by calculation based on the amount of the anionic surfactant (B) incorporated on the occasion of preparing the aqueous fluoropolymer dispersion.

The aqueous fluoropolymer dispersion of the present invention contains a water-soluble polymer (C).

The water-soluble polymer (C) so referred to herein is a compound having a solubility in water of not lower than 0.1 mg/100 ml and having a molecular weight of 1000 to 20000000. The solubility in water is preferably not lower than 1 mg/100 ml.

Provided that it is within the range mentioned above, the molecular weight is preferably not lower than 5000, more preferably 8000 to 5000000, further preferably not higher than 2000000, particularly preferably 10000 to 2000000.

In particular for the purpose of reducing the viscosity of the aqueous fluoropolymer dispersion of the present invention in the case of the PFOA content being reduced, the water-soluble polymer (C) in that aqueous dispersion preferably has a molecular weight of 50000 to 1000000, more preferably 50000 to 500000. When the water-soluble polymer (C) has a molecular weight lower than 1000, it may not produce the viscosity reducing effect and, when the molecular weight thereof is higher than 20000000, the viscosity tends to increase.

The water-soluble polymer (C) preferably comprises at least one selected from the group consisting, for example, of polyacrylic acid, polyacrylic acid derivatives, polyvinylpyrrolidone, poly(vinyl methyl ether), poly(vinyl alcohol), poly(ethylene oxide) and poly(ethylene oxide) copolymers. More preferably, it is polyacrylic acid, a polyacrylic acid derivative, polyvinylpyrrolidone, poly(vinyl methyl ether), poly(vinyl alcohol) or poly(ethylene oxide) and still more preferably is polyvinylpyrrolidone or poly(ethylene oxide).

The compounds enumerated above may be used singly or two or more of them may be used.

As the polyacrylic acid derivatives, there may be mentioned polyacrylic acid salts, polyacrylamide and polyacrylic acid esters, among others. As for the "polyacrylic acid salts, polyacrylamide and polyacrylic acid esters", only one genus out of these three genera may be used or two or more genera may be used and, for each of these three general, one single species or two or more species may used.

The polyacrylic acid salts are not particularly restricted but include, among others, salts formed from polyacrylic acid and a monovalent cation. As the monovalent cation, there may be mentioned, for example, $Li^+$, $Na^+$, $K^+$ and $NH_4^+$. Among them, $Na^+$ and $NH_4^+$ are preferred. The "polyacrylic acid salts" so referred to herein include partly or wholly dissociated forms thereof as occurring in the aqueous fluoropolymer dispersion of the present invention.

The polyacrylic acid esters are not particularly restricted but includes, among others, polyacrylic acid alkyl esters, and the alkyl group in the polyacrylic acid alkyl esters is preferably an alkyl group of 1 to 5 carbon atoms, more preferably an alkyl group of 1 to 3 carbon atoms.

In the practice of the present invention, polyacrylic acid salts and polyacrylamide are preferred among the polyacrylic acid derivatives.

The above-mentioned polyacrylic acid and derivatives thereof preferably have an average molecular weight of 10000 to 20000000, more preferably not higher than 10000000. While the mechanical stability is improved with the increase in average molecular weight, an excessively high average molecular weight increases the viscosity of the aqueous dispersion, possibly making handling difficult. A more preferred lower limit is 20000, a more preferred upper limit is 5000000, and a still more preferred upper limit is 2000000.

The above-mentioned polyvinylpyrrolidone preferably has an average molecular weight of 10000 to 20000000. While the mechanical stability is improved with the increase in average molecular weight, an excessively high average molecular weight increases the viscosity of the aqueous dispersion, possibly making handling difficult. A more preferred lower limit is 20000 and a more preferred upper limit is 10000000.

The above-mentioned poly(vinyl methyl ether) preferably has an average molecular weight of 10000 to 20000000. While the mechanical stability is improved with the increase in average molecular weight, an excessively high average molecular weight increases the viscosity of the aqueous dispersion, possibly making handling difficult. A more preferred lower limit is 20000 and a more preferred upper limit is 10000000.

The above-mentioned poly(vinyl alcohol) preferably has a degree of polymerization of 300 to 6000. While high degrees of polymerization result in high molecular weights and in improvements in mechanical stability, an excessively high degree of polymerization increases the viscosity of the aqueous dispersion, possibly making handling difficult. A more preferred lower limit is 500 and a more preferred upper limit is 5000.

The degree of saponification of the poly(vinyl alcohol) is preferably 70 to 99 mole percent. Within this range, a higher degree of saponification results in a lower water solubility and a lower degree of saponification results in a higher water solubility, and the above range is appropriate for preparing stable aqueous dispersions. A more preferred lower limit is 75 mole percent, a more preferred upper limit is 98 mole percent, and a still more preferred upper limit is 95 mole percent.

Preferred as the above-mentioned poly(ethylene oxide) is one having a molecular weight of 8000 to 20000000. A more preferred lower limit to the poly(ethylene oxide) is 100000, a more preferred upper limit is 2000000, and a still more preferred upper limit is 1000000.

As the above-mentioned poly(ethylene oxide) copolymers, there may be mentioned, for example, block copolymers with an alkylene oxide such as polypropylene oxide.

In cases where the poly(ethylene oxide) copolymers are block copolymers derived from ethylene oxide (EO) and propylene oxide (PO), the EO content thereof is preferably not lower than 45% by mass but lower than 90% by mass relative to the total content of EO and PO. A more preferred lower limit to the EO content is 50% by mass and a more preferred upper limit is 85% by mass.

In the aqueous fluoropolymer dispersion of the present invention, the water-soluble polymer (C) preferably amounts to 0.00001 to 5 parts by mass per 100 parts by mass of the fluoropolymer. When the amount is smaller than 0.00001 part by mass per 100 parts by mass of the fluoropolymer, the mechanical stability may become insufficient in some instances and, when the amount is in excess of 5 parts by mass per 100 parts by mass of the fluoropolymer, the viscosity of the aqueous dispersion becomes increased, possibly making handling difficult. A more preferred lower limit to the addition level for the water-soluble polymer (C) is 0.0001 part by mass and a more preferred upper limit thereto is 2.1 parts by mass, per 100 parts by mass of the fluoropolymer.

The concentration of the water-soluble polymer (C), so referred to herein, can be determined as the mass thereof per 100 parts by mass of the fluoropolymer based on the fluoropolymer concentration mentioned above and the amount of the water-soluble polymer (C) incorporated on the occasion of preparing the aqueous fluoropolymer dispersion of the present invention.

The aqueous fluoropolymer dispersion of the present invention may contain such a surfactant as a nonionic surfactant in addition to the above-mentioned fluoropolymer, anionic surfactant (B), water-soluble polymer (C) and aqueous medium. As the above-mentioned nonionic surfactant, there may be mentioned polyoxyethylene derivatives as ether type nonionic surfactants such as polyoxyethylene alkylphenyl ethers, polyoxyethylene alkyl ethers and polyoxyethylenealkylene alkyl ethers, ester type nonionic surfactants such as sorbitan fatty acid esters, polyoxyethylenesorbitan fatty acid esters, polyoxyethylenesorbitol fatty acid esters, glycerol fatty acid esters and polyoxyethylene fatty acid esters, and amine type nonionic emulsifiers such as polyoxyethylene alkylamines and alkylalkanolamides. Further, from the environmental viewpoint, nonionic surfactants having no alkylphenol moiety within the structure can preferably be used.

The nonionic surfactant mentioned above preferably has a molecular weight lower than 1000, more preferably lower than 800, still more preferably lower than 600.

The above-mentioned aqueous fluoropolymer dispersion can contain such a nonionic surfactant as mentioned above in an amount not exceeding 50 parts by mass, more preferably not exceeding 20 parts by mass, still more preferably not exceeding 10 parts by mass, per 100 parts by mass of the fluoropolymer. The nonionic surfactant content (N) so referred to herein is determined by weighing about 1 g (X g) of the sample in an aluminum cup with a diameter of 5 cm, heating the sample at 100° C. for 1 hour to give a heating residue (Y g), further heating the heating residue (Y g) at 300° C. for 1 hour to give a heating residue (Z g) and making a calculation according to the equation: $N=[(Y-Z)/Z]\times100(\%)$.

In the aqueous fluoropolymer dispersion of the present invention, there may be incorporated one or more of various known additives each at a level at which the effects of the present invention will not be lessened. As such additives, there may be mentioned, for example, pigments, fillers, antifoaming agents, drying retarders, film-forming agents, leveling agents, anticissing agents and film-forming auxiliaries, among others.

The pigments are not particularly restricted but include, among others, titanium oxide, carbon black, red iron oxide and other known pigments.

The fillers are not particularly restricted but include those known in the art.

As the antifoaming agents, there may be mentioned, for example, nonpolar solvents such as toluene, xylene and hydrocarbon compounds of 9 to 11 carbon atoms.

As the drying retarders, there may be mentioned, for example, solvents having a boiling point of about 200 to 300° C. Preferred as such solvents are aqueous solvents.

Usable as the film-forming agents are those known in the art, for example water-dispersible acrylic resins, water-dispersible silicone resins.

As the leveling agents or anticissing agents, there may be mentioned, for example, fluorinated surfactants and silicone-based surfactants, among others.

The method of preparation is not limited. However, the aqueous fluoropolymer dispersion of the present invention can be prepared, for example, by adding the anionic surfactant (B) and water-soluble polymer (C), if desired together with some other additive or additives, to an aqueous dispersion of fluoropolymer as obtained by polymerization, with stirring, followed by mixing up.

The aqueous dispersion of fluoropolymer in the practice of the present invention comprises particles of the same fluoropolymer as the one present in the desired aqueous fluoropolymer dispersion as dispersed in the above-mentioned aqueous medium.

The aqueous dispersion of fluoropolymer can be prepared by any of the polymerization methods known in the art.

The above aqueous dispersion of fluoropolymer may be the dispersion as obtained after polymerization or a dispersion resulting from adjustment of the fluoropolymer particles concentration, surfactant concentration and so forth by such after-treatment as concentration or dilution following polymerization. The above aqueous dispersion of fluoropolymer is preferably one obtained by properly adjusting the respective concentrations mentioned above according to the desired aqueous dispersion of fluoropolymer.

Preferred ranges for the amount of particles of fluoropolymer and the concentrations of the respective surfactants in the above aqueous dispersion of fluoropolymer are the same as those given hereinabove referring to the aqueous fluoropolymer dispersion of the present invention.

In the above-mentioned preparation, the anionic surfactant (B) and water-soluble polymer (C) can also be added on the occasion of preparing the aqueous dispersion of fluoropolymer and, for example, they may be added as the dispersants conventionally used in concentration of the polymerization product aqueous dispersion. It is generally preferred, however, that they be additionally added to the aqueous dispersion of fluoropolymer after preparation thereof to adjust the viscosity of the desired aqueous fluoropolymer dispersion.

The operation conditions in the above-mentioned stirring, addition and mixing can be properly selected according to the components in the composition used and the amounts thereof. Preferably, the operations are carried out at a temperature of 5 to 40° C.

The aqueous fluoropolymer dispersion of the present invention is very low in the content of the fluorinated surfactant (A), so that it undergoes no discoloration even when processed into films, coating films and the like. Furthermore, the aqueous fluoropolymer dispersion contains the above-mentioned anionic surfactant (B), so that, in spite of the high fluoropolymer concentration, it is low in viscosity and excellent also in temperature stability, storage stability, applicability and penetration in impregnation.

The aqueous fluoropolymer dispersion of the present invention has an appropriate viscosity and is excellent in mechanical stability since the above-mentioned anionic surfactant (B) prevents the aqueous dispersion from becoming increased in viscosity and, in addition, the above-mentioned water-soluble polymer (C) presumably protects the particles of fluoropolymer against mechanical stresses.

The aqueous fluoropolymer dispersion of the present invention is superior in mechanical stability, in particular, to the aqueous fluoropolymer dispersion containing the water-soluble polymer (C) incorporated alone therein. While the reason therefore is not clear, the cause presumably resides in the combined use of the anionic surfactant (B) and water-soluble polymer (C).

The aqueous fluoropolymer dispersion of the present invention can have a viscosity at 25° C. of 0.01 to 0.16 Pa·s and a viscosity at 35° C. of 0.01 to 0.10 Pa·s.

The aqueous fluoropolymer dispersion of the present invention can have a viscosity at 25° C. preferably not higher than 0.075 Pa·s, more preferably not higher than 0.05 Pa·s, and a viscosity at 35° C. preferably not higher than 0.075 Pa·s, more preferably not higher than 0.05 Pa·s.

The viscosity so referred to herein is determined at a temperature of 25° C. or 35° C. according to JIS K 6893 using a type B rotational viscometer (product of Tokyo Keiki Co., Ltd.).

The aqueous fluoropolymer dispersion of the present invention is excellent in mechanical stability, as described hereinabove.

The mechanical stability, so referred to herein, is evaluated in the following manner. A 100-ml portion of the aqueous fluororesin dispersion to be tested is maintained at 35° C. and circulated using a diaphragm pump equipped with a poly(vinyl chloride) tube with an inside diameter of 8 mm and an outside diameter of 11 mm at a rate of 1500 ml/minute for 20 minutes and then filtered through a 200-mesh SUS stainless steel screen. The oversize fraction is measured, and the proportion (% by mass) thereof to the amount of the fluoropolymer in the aqueous fluoropolymer dispersion used is determined and used for evaluation as a mechanical stability index. Generally, the aqueous fluoropolymer dispersion of the present invention can have a mechanical stability index of not higher than 1.5% by mass, preferably not higher than 1% by mass.

The aqueous fluoropolymer dispersion of the present invention can be processed, for example, into films, impregnated articles and so forth.

When the aqueous fluoropolymer dispersion of the present invention is processed into films, the films can serve as coating materials for metal-made cooking utensils, bearings, valves, electric wires, metal foils, boilers, pipes, ship hulls, oven linings, iron bottoms, ice-making trays, snow shovels, plows, chutes, conveyors, rolls, molds, dies, saws, files, drills, other tools, kitchen knives, scissors, hoppers, other containers for industrial use (in particular for use in the semiconductor industry), casting molds and so forth. The films can suitably be used as coating materials for high-frequency printed circuit boards, conveyor belts and packing materials, among others.

The processing into the films mentioned above can be carried out in the conventional manner.

The aqueous fluoropolymer dispersion of the present invention can provide manufacturing impregnated articles by impregnation with the dispersion.

The to-be-treated impregnation articles are not particularly restricted but include, among others, fibrous substrates, woven or nonwoven fabrics and the like. The fibrous substrates are not particularly restricted but include, among others, glass fibers, carbon fibers, and aramid fibers (Kevlar (registered trademark) fibers etc.). The impregnation can be carried out in the conventional manner.

The aqueous fluoropolymer dispersion of the present invention is preferably used as processing aids. The aqueous dispersion, when it is incorporated as a processing aid into a host polymer, can improve the melt strength in melt-processing of the host polymer, mechanical strength, electrical properties, flame retardancy, anti-dripping properties, slidability of the polymer obtained.

The aqueous fluoropolymer dispersion of the present invention, when the fluoropolymer is PTFE or modified PTFE, is also preferably blended with a resin other than PTFE to produce a processing aid. For example, the aqueous dispersion of the invention is preferred as PTFE materials described in Japanese Kokai (Laid-open) Publication H11-49912, Japanese Kokai 2003-24693, U.S. Pat. No. 5,804,654, Japanese Kokai H11-29679, and Japanese Kokai 2003-2980. The processing aids made from the aqueous dispersion are not inferior to the processing aids described in the above patent documents.

The aqueous fluoropolymer dispersion of the present invention is preferably co-coagulated by mixing with dispersions of melt-processable resins to produce co-coagulation powder. The co-coagulation powder is suitably used as processing aids. As the melt-processable resin, there may be mentioned, for example, FEP, PFA, ETFE, and EFEP. Among them, FEP is preferred.

The host polymer to be added the processing aid may take any of such forms as a powder, pellets and an emulsion. The addition is preferably carried out while providing a shearing force by any of the various means known in the art such as extrusion kneading and roll kneading to blend resins sufficiently.

The aqueous fluoropolymer dispersion of the present invention is preferably used as dust suppressants. The dust suppressant can be used in the process for suppressing dusting of dusting materials by admixing with dusting materials, followed by providing a compressing-shearing action at the temperature of 20 to 200° C. to fibrillate PTFE, as described in Japanese Patent 2827152 and 2538783.

The dust suppressant is preferably used for dust-suppression treatment in various fields such as building products, soil stabilizers, solidification materials, fertilizers and manures, landfill disposals of incineration ash and harmful substance, explosion protection, and cosmetics.

The aqueous fluoropolymer dispersion of the present invention is preferably used as a dispersion for obtaining PTFE fibers by dispersion spinning method. The dispersion spinning method is a method for producing PTFE fibers comprising the steps of forming a mixture by mixing the aqueous fluoropolymer dispersion with a solution of a matrix polymer, forming an intermediate fiber structure by extrusion processing of the mixture, and forming PTFE fibers by sintering the intermediate fiber structure to decompose the matrix polymer and coalesce the PTFE particles.

Effects of the Present Invention

The aqueous fluoropolymer dispersion of the present invention, which has the constitution described hereinabove, has an adequate level of viscosity and is excellent in mechanical stability even when the content of the fluorinated surfactant (A) is very low and the fluoropolymer concentration is high.

BEST MODES FOR CARRYING OUT THE INVENTION

The following experiment examples and test examples illustrate the present invention in further detail. These experiment examples and test examples are, however, by no means limitative of the scope of the present invention.

In the experiment examples and test examples, "part(s)" indicates "part(s) by mass", unless otherwise specified.

The measurements made in each experiment example were carried out by the methods described below.

(1) Average Particle Diameter

A working curve was constructed which shows the relation between the transmittance of incident light rays having a wavelength of 550 nm per unit length of the aqueous fluoropolymer dispersion and the average particle diameter determined by particle diameter measurements in a certain specific direction on a transmission electron photomicrogaph, and the average particle diameter of a sample was determined, using the working curve, from the transmittance as measured in the above manner.

(2) Fluoropolymer Concentration (P)

The concentration was determined by weighing about 1 g (X g) of the sample in an aluminum cup with a diameter of 5 cm, drying the sample at 100° C. for 1 hour and then further drying at 300° C. for 1 hour to give a heating residue (Z) and making a calculation as follows: P=Z/X×100(%).

(3) Fluorinated Surfactant Concentration

The concentration was determined by carrying out high-performance liquid chromatography [HPLC] under the conditions given below. In calculating the fluorinated surfactant concentration, use was made of a working curve constructed based on the data obtained by carrying out HPLC measurements under the same conditions using corresponding samples each having a known fluorinated surfactant concentration. The detection limit in this assay method is 0.1 ppm of the aqueous dispersion. In determining the concentration in the aqueous fluoropolymer dispersion, an equal volume of methanol was added to the aqueous dispersion and the mixture was subjected to Soxhlet extraction, which was followed by HPLC.

(Measurement Conditions)

Column: ODS-120T (4.6 ⌀×250 mm, product of Tosoh Corp.)
Developing solution: acetonitirle/0.6% (by mass) aqueous perchloric acid solution=1/1 (vol/vol %)
Sample size: 20 μl,
Flow rate: 1.0 ml/minute
Detection wavelength: UV 210 nm
Column temperature: 40° C.

(4) Nonionic Surfactant Content (N)

About 1 g (X g) of each sample was weighed in an aluminum cup with a diameter of 5 cm, the sample was heated at 100° C. for 1 hour to give a heating residue (Y g), the heating residue (Y g) was further heated at 300° C. for 1 hour to give a heating residue (Z g) and a calculation was made according to the equation: N=[(Y−Z)/Z]×100(%)

(5) Anionic Surfactant (B) and Water-Soluble Polymer (C)

The content was determined by measurement according to the measurement method described above under (3) or calculated from the amount of the anionic surfactant (B) or water-soluble polymer (C) incorporated on the occasion of preparing the aqueous fluoropolymer dispersion.

(6) Viscosity

Viscosity measurements were carried out according to JIS K 6893 using a type B rotational viscometer (product of Tokyo Keiki Co., Ltd.).

(7) Mechanical Stability Index

A 100-ml portion of the aqueous fluororpolymer dispersion to be tested was maintained at 35° C. and circulated using a diaphragm pump equipped with a poly(vinyl chloride) tube with an inside diameter of 8 mm and an outside diameter of 11 mm at a rate of 1500 ml/minute for 20 minutes and then filtered through a 200-mesh SUS stainless steel screen. The oversize fraction was measured, and the proportion (% by mass) thereof to the amount of the fluoropolymer contained in the aqueous fluoropolymer dispersion used was determined for use as a mechanical stability index.

PREPARATION EXAMPLE 1

A nonionic surfactant ($C_{13}H_{27}O(C_2H_4O)_9H$; product name Surfonic TDA-8, product of Huntsman, cloud point 47° C.) was added to an aqueous PTFE dispersion containing particles (average particle diameter 280 nm) of polytetrafluoroethylene [PTFE] having a molecular weight of 3500000 and the concentration of the above nonionic surfactant was adjusted to 5 parts by mass per 100 parts by mass of PTFE and the fluoropolymer concentration [P.C.] to 30% by mass. The aqueous PTFE dispersion 1 obtained had an ammonium perfluorooctanoate [PFOA] concentration of 1.5 parts by mass per 100 parts by mass of PTFE.

The above aqueous PTFE dispersion 1 was passed through a column (inside diameter 20.3 cm, capacity 56 L) packed with Amberlite 402 (product of Rohm and Haas) at a temperature of 30° C. and a rate of 0.7 gal/minute to give an aqueous PTFE dispersion 2 having a P.C. of 30% by mass and containing the above nonionic surfactant at a concentration of 5 parts by mass per 100 parts by mass of PTFE and containing PFOA at a concentration of $5.0 \times 10^{-5}$ part by mass per 100 parts by mass of PTFE.

Further, the above nonionic surfactant and water were added to the aqueous PTFE dispersion 2 (90 L), and the P.C. was adjusted to 29.5% by mass, the nonionic surfactant concentration to 17 parts by mass per 100 parts by mass of PTFE and the pH to 10 using aqueous ammonia. The so-adjusted dispersion was allowed to stand at a temperature of 50° C. for 14 hours for cloud point concentration to give an aqueous PTFE dispersion 3 (23 L) having a P.C. of 76% by mass and containing the above nonionic surfactant at a concentration of 3.2 parts by mass per 100 parts by mass of PTFE and PFOA at a concentration of 0.2 ppm.

EXPERIMENT EXAMPLES 1 TO 8

An anionic surfactant (B) and a water-soluble polymer (C) were added, at respective addition levels given in Table 1, to the aqueous PTFE dispersion 3 (300 g) and, further, water and a nonionic surfactant ($C_{13}H_{27}O(C_2H_4O)_9H$; product name Surfonic TDA-8, product of Huntsman) were added to a final concentration of the nonionic surfactant of 4.9 parts by mass per 100 parts by mass of PTFE and the P.C. was adjusted to 60% by mass to give an aqueous PTFE dispersion.

Each of the thus-obtained aqueous PTFE dispersions was measured for viscosities at 25° C. and 35° C. and for mechanical stability.

EXPERIMENT EXAMPLE 9

Water and a nonionic surfactant ($C_{13}H_{27}O(C_2H_4O)_9H$; product name Surfonic TDA-8, product of Huntsman) were added to the aqueous PTFE dispersion 3 (300 g) to a final concentration of the nonionic surfactant of 4.9 parts by mass per 100 parts by mass of PTFE and the P.C. was adjusted to 60% by mass to give an aqueous PTFE dispersion.

The thus-obtained aqueous PTFE dispersion was measured for viscosities at 25° C. and 35° C. and for mechanical stability.

EXPERIMENT EXAMPLES 10 AND 11

An aqueous PTFE dispersion was prepared in the same manner as in Experiment Example 1 except that an anionic surfactant (B) or water-soluble polymer (C) specified in Table 1 was added singly in lieu of the anionic surfactant (B) plus water-soluble polymer (C).

Each of the aqueous PTFE dispersions was measured for viscosities at 25° C. and 35° C. and for mechanical stability.

EXPERIMENT EXAMPLES 12 AND 13

To an aqueous PTFE dispersion 4 (300 g) having a PFOA. concentration of $5 \times 10^{-2}$ parts per 100 parts by mass of PTFE was added a nonionic surfactant ($C_{13}H_{27}O(C_2H_4O)_9H$; product name Surfonic TDA-8, product of Huntsman) to a final concentration of 4.9 parts by mass per 100 parts by mass of PTFE, and an aqueous PTFE dispersion of Experiment Example 12 was prepared in the same manner as in Experiment Example 1 except that the water-soluble polymer (C) specified in Table 1 was added singly. Separately, an aqueous PTFE dispersion of Experiment Example 13 was prepared by adding, following the addition of the above-mentioned nonionic surfactant, water alone to adjust the P.C. to 60% by mass.

Each of the aqueous PTFE dispersions was measured for viscosities at 25° C. and 35° C. and for mechanical stability.

EXPERIMENT EXAMPLES 14 AND 15

An aqueous PTFE dispersion 14 or 15 was prepared in the same manner as in Experiment Example 1 except that PFOA alone was added in lieu of the anionic surfactant (B) plus water-soluble polymer (C).

Each of the aqueous PTFE dispersions was measured for viscosities at 25° C. and 35° C. and for mechanical stability.

EXPERIMENT EXAMPLES 16 AND 17

A PTFE dispersion of Experiment Example 16 or Experiment Example 17 was prepared in the same manner as in Experiment Example 1 except that PFOA was used in lieu of the anionic surfactant (B) and the water-soluble polymer (C) and the level of addition thereof were changed.

Each of the aqueous PTFE dispersions was measured for viscosities at 25° C. and 35° C. and for mechanical stability.

The results obtained in each experiment example are shown in Table 1.

TABLE 1

| | PFOA conc. (ppm)*1 before adjustment | Nonionc TDA-8 (%)*2 | Specific compound (B) Species | Concentration (ppm)*3 | Water-soluble polymer (C.) Species | Concentration (ppm)*4 |
|---|---|---|---|---|---|---|
| Experiment Example 1 | 0.2 | 4.9 | C10-acid | 300 | Genapol PF80 (product of Clariant) | 2.1 |
| Experiment Example 2 | 0.2 | 4.9 | C10-acid | 300 | PVP | 0.2 |
| Experiment Example 3 | 0.2 | 4.9 | C10-acid | 300 | Polyethylene oxide, mol. wt. 1000000 (Wako Pure Chemical's reagent) | 0.3 |
| Experiment Example 4 | 0.2 | 4.9 | OTP | 10 | Genapol PF80 (product of Clariant) | 2.1 |
| Experiment Example 5 | 0.2 | 4.9 | PFHA | 400 | PVP | 0.1 |
| Experiment Example 6 | 0.2 | 4.9 | PFHA | 400 | Genapol PF80 (product of Clariant) | 2.0 |
| Experiment Example 7 | 0.2 | 4.9 | OTP | 10 | Genapol PF40 (product of Clariant) | 2.1 |
| Experiment Example 8 | 0.2 | 4.9 | OTP | 10 | Polyethylene oxide, mol. wt. 1000000 (Wako Pure Chemical's reagent) | 0.1 |
| Experiment Example 9 | 0.2 | 4.9 | — | 0 | — | 0 |
| Experiment Example 10 | 0.2 | 4.9 | C10-acid | 300 | — | 0 |
| Experiment Example 11 | 0.2 | 4.9 | — | 0 | Genapol PF80 (product of Clariant) | 2.1 |
| Experiment Example 12 | 500 | 4.9 | — | 0 | Genapol PF80 (product of Clariant) | 2.1 |
| Experiment Example 13 | 500 | 4.9 | — | 0 | — | 0 |
| Experiment Example 14 | 0.2 | 4.9 | —*5 | 100 | — | |
| Experiment Example 15 | 0.2 | 4.9 | —*6 | 50 | — | |
| Experiment Example 16 | 0.2 | 4.9 | —*7 | 100 | Polyethylene oxide, mol. wt. 1000000 (Wako Pure Chemical's reagent) | 0.2 |
| Experiment Example 17 | 0.2 | 4.9 | —*8 | 50 | Polyethylene oxide, mol. wt. 1000000 (Wako Pure Chemical's reagent) | 0.2 |

| | Viscosity ($Pa \cdot s \times 10^{-4}$) | | | Mechanical stability | |
|---|---|---|---|---|---|
| | Evaluation | 25° C. | 35° C. | Evaluation | Aggregated rate (%) |
| Experiment Example 1 | ○ | 28.7 | 25.3 | ◉ | 0.5 |
| Experiment Example 2 | ○ | | | ◉ | 0.4 |
| Experiment Example 3 | ○ | | | ◉ | 0.3 |
| Experiment Example 4 | ○ | | | ◉ | 0.8 |
| Experiment Example 5 | ○ | 26.5 | 27.0 | ◉ | 0.2 |
| Experiment Example 6 | ○ | 26.8 | 27.3 | ◉ | 0.5 |
| Experiment Example 7 | ○ | | | ○ | 2.0 |
| Experiment Example 8 | ○ | | | ◉ | 0.3 |
| Experiment Example 9 | X | >500 | | X | 10 |
| Experiment Example 10 | ○ | 20 | 33.7 | ○ | 2.5 |
| Experiment Example 11 | X | >500 | | ○ | 2.5 |
| Experiment Example 12 | ○ | 29.5 | 25.5 | ◉ | 0.8 |
| Experiment Example 13 | ○ | 32 | 25 | X | 5 |
| Experiment Example 14 | ○ | | | X | 6 |
| Experiment Example 15 | Δ | | | X | 7 |

TABLE 1-continued

| | | | |
|---|---|---|---|
| Experiment Example 16 | ◯ | ◯ | 1.8 |
| Experiment Example 17 | Δ | ◯ | 2.5 |

*[1-4]Each is the proportion relative to the amount of PTFE.
*[5-8]PFOA was added in an amount corresponding to 100 ppm (Experiment Example 14 or 16) or 50 ppm (Experiment Example 15 or 17) of the amount of PTFE.
PFHA = $C_5F_{11}COONH_4$
C10-acid = $CH_3(CH_2)_9COOH$
OTP = Sulfosuccinic acid dioctyl ester sodium salt solution (product of Nikko Chemicals, NIKKOL OTP-75)
TDA-8 = $C_{13}H_{27}O(C_2H_4O)_9H$
⊚—Satisfactorily usable;
◯—usable;
Δ—rather difficult to use;
X—difficult to use The respective results revealed that when the anionic surfactant (B) or water-soluble polymer (C) alone is incorporated, it is difficult to obtain aqueous dispersions having a low viscosity and showing good mechanical stability without increasing the PFOA concentration (Experiment Example 12), the aqueous dispersions obtained by incorporating both the anionic surfactant (B) and water-soluble polymer (C) are all have a low viscosity and show good mechanical stability in spite of the low PFOA concentration.

TEST EXAMPLE 1

An impregnated sheet was produced by impregnating a glass fiber sheet with the aqueous PTFE dispersion prepared in Experiment Example 1, followed by baking. The glass fiber sheet used had a thickness of 50 μm and the glass fiber sheet was moved at a rate of 1.2 m/minute. The aqueous PTFE dispersion was maintained at 25° C., the baking temperature was 380° C. and the baking time was 40 seconds. A 150-m-long impregnated sheet was produced over 125 minutes; no foreign matter was observed.

TEST EXAMPLE 2

An impregnated sheet was produced by impregnating a glass fiber sheet with the aqueous PTFE dispersion prepared in Experiment Example 9, followed by baking. The glass fiber sheet used and the processing conditions were the same as in Test Example 1. After the lapse of about 40 minutes following the start of impregnation and thereon, foreign matters were observed intermittently.

INDUSTRIAL APPLICABILITY

The aqueous fluoropolymer dispersion of the present invention, which has the constitution described hereinabove, has an adequate level of viscosity and is excellent in mechanical stability even when the content of the fluorinated surfactant (A) is very low and the fluoropolymer concentration is high.

What is claimed is:

1. A method for producing an aqueous fluoropolymer dispersion comprising the steps of:
   polymerizing a fluoromonomer in an aqueous medium in the presence of a fluorinated surfactant (A) having a molecular weight lower than 1000 to obtain an aqueous fluoropolymer dispersion comprising a particle of fluoropolymer as dispersed in the aqueous medium,
   eliminating the fluorinated surfactant (A) to obtain an aqueous fluoropolymer dispersion containing the, fluorinated surfactant (A) of not higher than 100 ppm of the mass of the fluoropolymer, and
   adding an anionic surfactant (B) other than said fluorinated surfactant (A) to the aqueous fluoropolymer dispersion, wherein the anionic surfactant (B) is $C_5F_{11}COOH$ or salt thereof.

2. The method of claim 1,
which comprises a step of adding a water-soluble polymer (C) after the step of eliminating the fluorinated surfactant (A).

3. The method of claim 1,
wherein the elimination of the fluorinated surfactant (A) is carried out in the presence of a nonionic surfactant.

4. The method of claim 1,
wherein the elimination of the fluorinated surfactant (A) is carried out by a cloud point concentration method, an anion exchange resin treatment method or an ultrafiltration method.

5. The method of claim 2,
wherein the water-soluble polymer (C) comprises at least one polymer selected from the group consisting of polyacrylic acid, polyacrylic acid derivatives, polyvinylpyrrolidone, poly(vinyl methyl ether), poly(vinyl alcohol), poly(ethylene oxide) and poly(ethylene oxide) copolymers.

6. The method of claim 3,
wherein the nonionic surfactant is polyoxyethylene alkylphenyl ethers, polyoxyethylene alkyl ethers, polyoxyethylenealkylene alkyl ethers, sorbitan fatty acid esters, polyoxyethylenesorbitan fatty acid esters, polyoxyethylenesorbitol fatty acid esters, glycerol fatty acid esters, polyoxyethylene fatty acid esters, polyoxyethylene alkylamines or alkylalkanolamides.

7. The method of claim 1, wherein the anionic surfactant (B) is added in an amount of 5 to 5000 ppm of the mass of the fluoropolymer.

8. The method of claim 1, wherein the anionic surfactant (B) is added in an amount of 5 to 500 ppm of the mass of the fluoropolymer.

9. The method of claim 2, wherein the water-soluble polymer (C) has a molecular weight of 5000 to 20000000.

10. The method of claim 2, wherein the water-soluble polymer (C) has a molecular weight of 50000 to 1000000.

11. The method of claim 1, wherein the fluorinated surfactant (A) is a fluorinated anionic surfactant (A1) of 7 to 10 carbon atoms.

12. The method of claim 1, wherein said method produces an aqueous fluoropolymer dispersion having the particle of fluoropolymer amounting to 30 to 70% by mass of the aqueous fluoropolymer dispersion.

13. The method of claim 1, wherein said method produces an aqueous fluoropolymer dispersion having the viscosity at 25° C. is 0.01 to 0.16 Pa·s.

14. The method of claim 1, wherein said method produces an aqueous fluoropolymer dispersion for dispersion spinning method.

15. The method of claim 1, wherein said method produces an aqueous fluoropolymer dispersion for a dust suppressant.

* * * * *